(12) United States Patent
Mei

(10) Patent No.: US 7,000,482 B2
(45) Date of Patent: Feb. 21, 2006

(54) VARIABLE CAPACITANCE MEASURING DEVICE

(75) Inventor: Hai Mei, Plano, TX (US)

(73) Assignee: Mykrolis Corporation, Billerica, MA (US)

( * ) Notice: Subject to any disclaimer, the term of this patent is extended or adjusted under 35 U.S.C. 154(b) by 33 days.

(21) Appl. No.: 10/178,170

(22) Filed: Jun. 24, 2002

(65) Prior Publication Data

US 2003/0233882 A1 Dec. 25, 2003

(51) Int. Cl.
 *G01L 9/12* (2006.01)

(52) U.S. Cl. .............................. 73/718; 73/724; 73/753
(58) Field of Classification Search ........... 73/700–756; 361/283.4, 283.3
 See application file for complete search history.

(56) References Cited

U.S. PATENT DOCUMENTS

| | | | | |
|---|---|---|---|---|
| 4,135,936 | A | | 1/1979 | Ballard, Jr. ................. 106/39.6 |
| 4,414,282 | A | | 11/1983 | McCollister et al. ....... 428/433 |
| 4,536,203 | A | | 8/1985 | Kramer .......................... 65/29 |
| 4,823,603 | A | | 4/1989 | Ferran et al. .................. 73/724 |
| 4,970,577 | A | * | 11/1990 | Ogihara et al. ............. 257/698 |
| 5,542,300 | A | | 8/1996 | Lee |
| 5,820,989 | A | | 10/1998 | Reed et al. .................. 428/426 |
| 5,939,639 | A | * | 8/1999 | Lethbridge .................... 73/724 |
| 6,105,436 | A | * | 8/2000 | Lischer et al. ................ 73/724 |
| 6,205,861 | B1 | * | 3/2001 | Lee .............................. 73/724 |
| 6,568,274 | B1 | * | 5/2003 | Lucas et al. .................. 73/718 |

OTHER PUBLICATIONS

Anthony Rollett, *Heat Treatment of Glass–Ceramics*, Carnetie Mellon University, 4 pgs.
"Glass–Ceramics: Everything you need to know", 3 pgs.
Stroud, J.S., *Property Sheet*, Schott Glass Technologies Inc., Duryea, PA, 8 pgs., 1997.
Henderson, et al., *Determination of the Optimum Crystallization Conditions of a High Thermal Expansion Glass–Ceramic*, Monsanto Research Corporation for the U.S. Dept of Energy, 9 pgs., 1984.
*Introduction to Mica*, Inderchand Rajgarhla & Sons (P) Ltd, http://www.icrmica.com/icrmica_mica_introduction.htm, 2 pgs.
Schott Glas, *Types of Technical Glasses*, pp. 2–39, Mainz, 2000.
Shcott Glas, *Electronic Packaging Glass–to–Metal Seals*, 24 pgs.
*How to Select and Use Capacitance Diaphragm Gauges*, Millpore, A Vacuum Applications Guide, Millipore Corporation, 16 pgs., 2000.
*Glass–Mica Composites, Mykroy/Mycalex Ceramics*, Spaulding Composites Co., http://www.mykroy–mycalex.com/prop5.htm, 4 pgs.

* cited by examiner

*Primary Examiner*—William Oen
*Assistant Examiner*—Jermaine Jenkins
(74) *Attorney, Agent, or Firm*—Sprinkle IP Law Group

(57) ABSTRACT

A variable capacitance measuring device can comprise any one or more features in various different embodiments allow a reliable, compact device to be achieved. A capacitor electrode, a gettering housing, and pinch-off connector may be aligned along a common axis may reduce width dimensions without a substantial increase in length. Temperature-induced variations may be reduced by selecting materials that have coefficients of thermal expansion relatively closer to one another. Substantially varying topologies for ceramic-metal interfaces may reduce the likelihood of external contaminants from reaching the evacuated portion of the device. A tube can be used between the capacitor portion and a gettering housing to isolate external forces and getter activation heat from the sensor. The same tube also reduces heat loss from a heated sensor and protects the electronics from overheating. Embodiments also include processes for using and forming the devices.

23 Claims, 3 Drawing Sheets

VARIABLE CAPACITANCE MEASURING DEVICE

FIELD OF THE INVENTION

This invention relates in general to variable capacitance measuring devices, and more particularly, to variable capacitance measuring devices used as force or pressure sensors, components within the devices, and process for making them.

DESCRIPTION OF THE RELATED ART

Many pressure sensors include a variable capacitor to determine pressure. Some of these pressure sensors include a fixed electrode as one capacitor electrode and a diaphragm as another capacitor electrode. The diaphragm deforms when is a pressure difference across it. This varying gap between the diaphragm and the fixed electrode results in different capacitance values for a capacitor as the pressure changes.

While the principles of a capacitive pressure sensor are relatively simple, external factors can distort the pressure readings. This is particularly true for sensors to measure pressures significantly lower than atmospheric pressure because of its high sensitivity. For example, temperature changes can affect the capacitance values.

One attempt to solve the temperature-induced problem uses a pair of fixed electrodes on one side of the diaphragm. From an electrical standpoint, the pressure sensor includes two capacitors connected in series. A layout of the two fixed electrodes built on an insulator, typically a ceramic disk, has a center electrode surrounded and spaced apart from an annular electrode. Additionally, ruby rollers may be used to support the ceramic disk in order to minimize the frictional forces between the parts in the pressure sensor as the temperature changes. The use of the two capacitors can be used to determine flow rate over a relatively larger range in temperatures by monitoring the difference in capacitance readings between the two capacitors between the diaphragm and each of the fixed electrodes.

The two-capacitor pressure sensor is not without problems. First, a trim operation is typically used to match the two the capacitances by changing the area for at least one of the relatively fixed electrodes. This operation tends to be a manual operation and involves some trial and error. Variations from pressure sensor to pressure sensor may occur. Although the ruby rollers or the like are able to improve temperature-induced hysteresis by minimizing "stick-slip" types of movements inside the sensors, the added complexity in design and manufacturing increases cost. Also, the contacts of ruby rollers and its supporting structures have stress concentrations and may adversely affect the long-term stability of the sensors. Because this pressure sensor uses the difference of the two capacitance readings to measure pressure, it needs a larger size diaphragm in order to gain enough sensitivity. Another problem is a long warm-up time, because the size and mass are relatively large, and the small ruby rollers or the like restrict the heat transfer. For example, it may take the pressure sensor one day to reach a steady-state temperature operating condition. Such a long warm-up is unacceptable to many manufacturing operations.

SUMMARY OF THE INVENTION

A variable capacitance measuring device can comprise any one or more features described in various embodiments to allow a reliable, compact device to be achieved. A capacitor electrode, a gettering housing, and pinch-off connector may be aligned along a common axis to reduce width dimensions without a substantial increase in length. By selecting materials that have coefficients of thermal expansion relatively close to one another, temperature-induced variations may be reduced. Substantially varying topologies for ceramic-metal interfaces may reduce the likelihood of external contaminants from reaching the evacuated portion of the device. A tube can be used between the capacitor portion and a gettering housing to isolate heat and stress between the getter housing and the sensor. Note that the present invention does not require all of the features described herein to be present within a single device. Embodiments also include processes for forming the devices or portions of them.

In one set of embodiments, a variable capacitance measuring device can comprise an electrode assembly and an insulating material. The insulating material may laterally surround the electrode assembly. The coefficient of thermal expansion of the insulating material can be within approximately 50% of the coefficient of thermal expansion of the electrode assembly.

In another embodiment, a variable capacitance measuring device can comprise an electrode, a housing adapted to hold a gettering material, and a pinch-off connector. The electrode, the housing, and the pinch-off connector may lie along a common axis.

Still another embodiment may include a component for a variable capacitance measuring device. The component can comprise a conductive portion, an electrode assembly, and an insulator. Each of the conductive portion and the electrode assembly can have a surface with a substantially varying topology. The insulator can contact the surfaces of the conductive portion and electrode assembly and electrically insulate the conductive portion from the electrode assembly.

Yet another embodiment may include a component for a variable capacitance measuring device. The component can comprise a main body portion, a housing adapted to hold a gettering material, and a tube lying between the main portion and the housing. The width of the tube can be less than the width of the housing.

In another set of embodiments, a process for using a variable capacitance measuring device can comprise applying a first signal to an electrode, a gettering housing, and a pinch-off connector; applying a second signal to a diaphragm; and measuring a capacitance of a capacitor that includes the electrode and the diaphragm. The electrode, the getter housing, and the pinch-off connector may lie along a common axis.

In still a further set of embodiments, a process for making a component for a variable capacitance measuring device can comprise holding an electrode assembly and a conductive portion in relatively stationary positions. The electrode assembly lies within a mold, and the conductive portion laterally surrounds and is spaced apart from the electrode assembly to form a spaced-apart region. The method can further comprise molding an insulating material to lie within the spaced-apart region.

The foregoing general description and the following detailed description are exemplary and explanatory only and are not restrictive of the invention, as defined in the appended claims.

BRIEF DESCRIPTION OF THE DRAWINGS

The present invention is illustrated by way of example and not limitation in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

Figure 5:
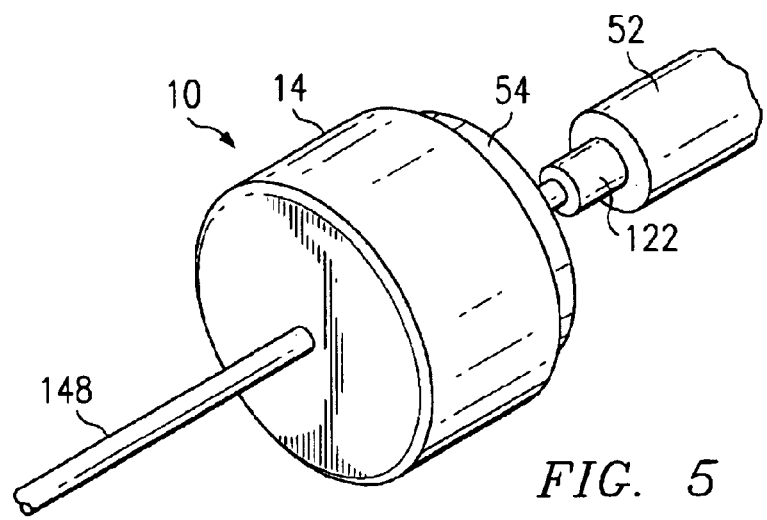

FIG. 5 includes an illustration of a perspective view of a pressure sensor including a heat sink and an electronic terminal.

DETAILED DESCRIPTION

Reference is now made in detail to the exemplary embodiments of the invention, examples of which are illustrated in the accompanying drawings. Wherever possible, the same reference numbers will be used throughout the drawings to refer to the same or like parts (elements).

A variable capacitance measuring device can comprise any one or more features described herein to allow a reliable, compact device to be achieved. In some embodiments, aligning a capacitor electrode, a gettering housing, and a pinch-off connector along approximately a common axis may reduce width dimensions without a substantial increase in length. The device is relatively smaller and reaches a steady-state temperature faster than prior capacitance sensors. In another set of embodiments, temperature-induced variations may be reduced by selecting materials for a capacitor portion of the sensor that have coefficients of thermal expansion relatively closer to one another. In still another set of embodiments, substantially varying topologies can be used for ceramic-metal interfaces to reduce the likelihood of air or other external contaminants from reaching the reference side of a diaphragm within the capacitor portion. In a further set of embodiments, a tube can be used between the capacitor portion of the device and the gettering housing to isolate heat and stress between the gettering housing and the sensor. Embodiments also include processes for forming the devices. The present invention is better understood after reading the descriptions of various embodiments that follow.

Figure 1:
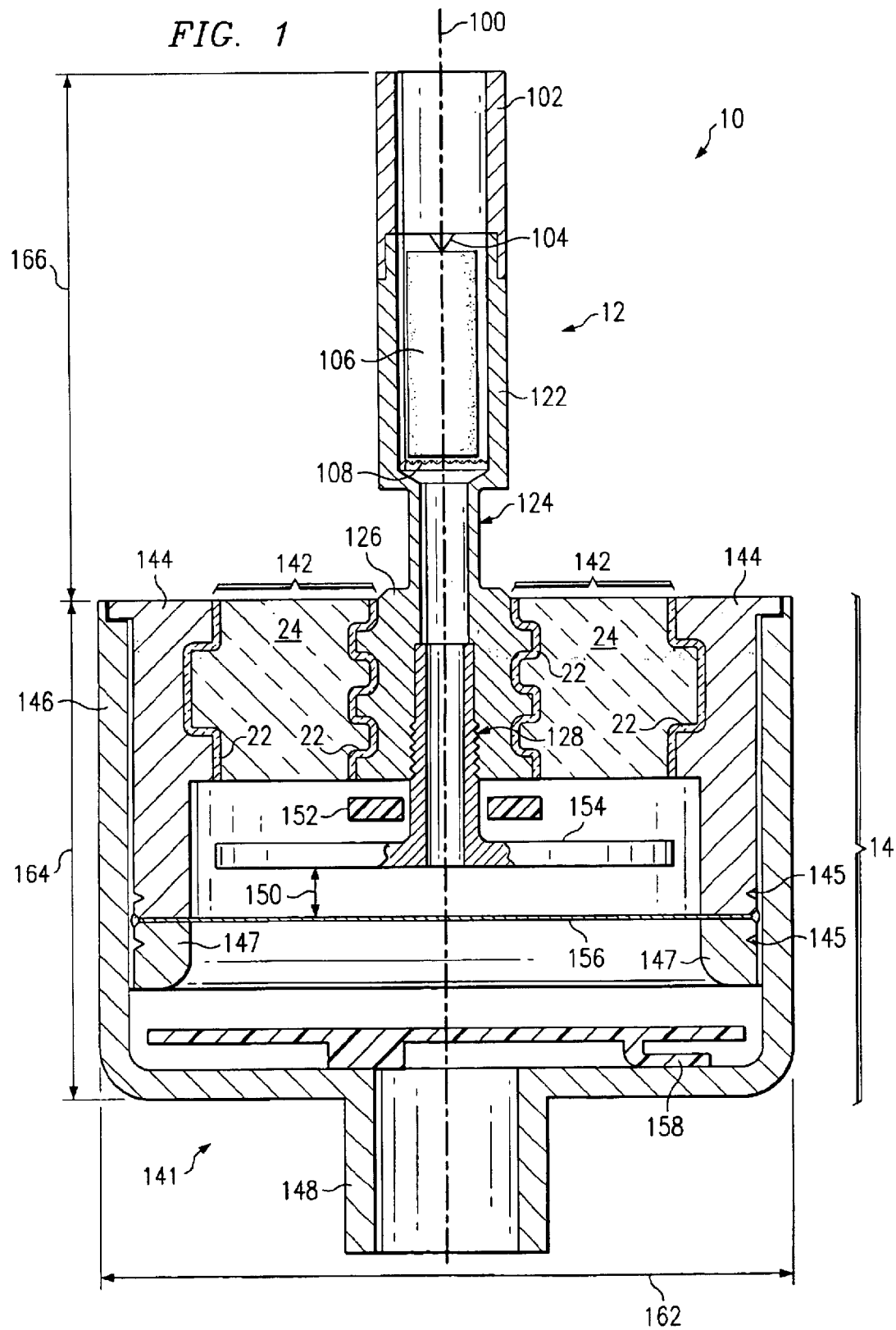
FIG. 1 includes an illustration of a cross-sectional view of a variable capacitance measuring device.

FIG. 1 includes an illustration of a cross-sectional view called a variable capacitance measuring device 10 that can be used as a force sensor, a pressure sensor, or the like. For simplicity throughout this specification, the variable capacitance measuring device 10 will be referred to as pressure sensor 10. Pressure sensor 10 can include a pinch-off connector 102 and an electrode assembly 12 that may be welded, brazed or soldered to each other. The pinch-off connector 102 can include a malleable material that can be welded shut. Connector 102 may include aluminum, copper, or the like.

The electrode assembly 12 can include a housing 122, a tube 124, and a main body portion 126. The housing 122 can be adapted to hold a gettering material 106. The gettering material can be used to absorb or adsorb contaminants or outgassing that may remain on the reference side of the diaphragm 156 after the sensor 10 is sealed. In this specification, the reference side of the diaphragm 156 includes the portions of the pressure sensor 10 on the side of the diaphragm 156 closer to the top of the illustration in FIG. 1, and the process side of the diaphragm 156 includes the portions of the pressure sensor 10 on the side of the diaphragm 156 closer to the bottom of the illustration in FIG. 1. In one non-limiting example of the gettering material, a SAES getter can be used and obtained from SAES Getters USA, Inc. of Colorado Springs, Colo. The gettering material 106 is held in place by a retainer 104 and a solids barrier 108 as illustrated in FIG. 1. Alternatively, the retainer 104 may be removed, and a slight pinch in gettering housing 122 or pinch-off connector 102 may be used to help hold the gettering material 106 in place.

The solids barrier 108 can lie along one side of the gettering material 106 to reduce the likelihood of particles from the gettering material 106 reaching the capacitor portion 14 of the pressure sensor 10. The solids barrier 108 may include a wire mesh screen, a sintered glass, a membrane, or the like. The solids barrier 108 may allow gas to flow through it but does not allow significantly large particles from gettering material 106 to enter the capacitor body 14.

The electrode assembly 12 can further include a tube 124 that lies between the housing 122 and the capacitor portion 14. The capacitor portion 14 may include the insulator 142 and a main body portion 126 of the electrode assembly 12. In addition, the wall of the tube 124 should be as thin as possible. The tube 124 may have a diameter (width) that is narrower than the diameter (width) of the housing 122. This tube 124 and its narrower diameter and thin wall help to reduce the amount of heat transferred to the capacitor portion 14 when the gettering material 106 is being activated at a high temperature. The tube 124 also reduces any external forces applied to the pinch-off connector 102 or the gettering housing 122 being transferred to the capacitor portion 14. When the capacitor portion 14 operates at an elevated temperature, the tube 124 helps to reduce the heat loss and protect electronics connected to the pinch off connector 102. The electrode assembly 12 may further include threads 128 along an inside portion of the main body portion 126. The threads 128 can be used to secure the electrode 154, which has complementary threads, to the electrode assembly 12. Other means for securing the electrode 154 to the electrode assembly 12 can include screws or bolts (separate from the electrode 154), rivets, welds, or the like.

The capacitor portion 14 can include an insulator 142, a reference-side ring 144, a process-side ring 147, weld preps 145, and a shell 146. Weld preps 145 help to retain welding heat to the joint and reduce the overall welding power, thus minimizing distortion to the parts. A capacitor housing 141 can include a combination of the reference-side ring 144 and the shell 146. Although not shown, the electrode 154 has an opening and a hollow shaft to allow for the evacuation of the reference side of the diaphragm 156. An optional shim 152 may lie between the electrode assembly 12 and the electrode 154 and be used to control the position of the electrode 154 relative to the diaphragm 156. The weld joint of rings 144, 147, and diaphragm 156 substantially prevents any fluids from flowing from the process side of the diaphragm 156 to the reference side of the diaphragm 156.

The process side of the diaphragm 156 can include a plasma shield 158 used to prevent potential damage to the sensor 10 if the sensor 10 is connected to a process using a plasma gas. A process tube 148 may be connected to the process side of the capacitor portion 14 and may be part of a flow measuring apparatus or as a stand-alone sensor for measuring force or pressure within a system. In one specific, non-limiting embodiment, the reference-side ring 144, the process-side ring 147, and the diaphragm 156 may be welded to each other as a subassembly. That subassembly may be welded to the shell 146 and using weld preps 145. In this embodiment, all metal-to-metal connections are welded.

The capacitor portion 14 can include a variable capacitor structure for the pressure sensor 10. A combination of the electrode 154, diaphragm 156, and the gap 150 between the electrode 154 and the diaphragm 156 can be the variable capacitor for pressure sensor 10. When the pressures on both sides of the diaphragm 156 are substantially the same, the distance between the electrode 154 and the diaphragm 156 may be in a range of approximately 50 to 250 microns.

In some embodiments, the pressure sensor 10 can be modified to be a differential pressure sensor. For example, the differential pressure sensor can be used in determining how much above or below atmospheric pressure a measured pressure is. The sensor 10 can be modified by removing the pinch-off connector 102, the retainer 104, and the gettering material 106. The solids barrier 108 may remain to substantially prevent particles from entering the capacitor portion 14. The reference side may be at substantially atmospheric pressure and the gas within the process tube 148 may be at a pressure above or below atmospheric pressure. In other embodiments, atmospheric pressure may be on the other side of the diaphragm 156. Electrical connections may be made to the tube 122 to provide a desired potential or other signal to the electrode 154. Another differential pressure sensing application is described later with respect to a mass flow controller.

Some of the physical features of the pressure sensor 10 are pointed out to note some of its advantages. First, the pressure sensor 10 has relatively smaller dimensions compared to a two-capacitor pressure sensor. The following dimensions are exemplary rather than limiting. Typically the width 162 of the pressure sensor 10 may be no greater than approximately 35 mm. The height of the capacitor portion 14, as illustrated by dimension to 164, may be no greater than approximately 20 mm, and the combined height of the housing 122 and the pinch-off connector 102 may be no greater than approximately 20 mm. In one specific embodiment, the width 162 is approximately 25 mm, and a combination of the dimensions 164 and 166 is approximately 30 mm. Therefore, a relatively smaller pressure sensor 10 can be made. The pressure sensor 10 may take less than approximately four hours to reach a steady-state temperature and may be less than approximately two hours in some situations. Compare this to the nearly 24 hours as seen with a conventional two-capacitor sensor. Compare this to the nearly 24 hours as commonly seen with a conventional two-capacitor sensor.

The electrode 154, the electrode assembly 12 (including the main body portion 126, the tube 124, and the housing 122), and the pinch off connector 102 can be centered about a common axis 100 as illustrated in FIG. 1. Aligning at least some of those items along the common axis 100 can allow the width of the pressure sensor 10 to be relatively narrower compared to a sensor where at least one of those items is aligned along a separate, substantially parallel axis.

Other than the flexing of the diaphragm 156, the sensor 10 has no moving parts. The sensor 10 is less likely to have mechanical failure or irreproducible readings due to failure or "stick-slip" movement of moving parts. Also, the sensor 10 does not have any rollers, such as ruby rollers. Therefore, the distortion and manufacturing complications associated with the rollers can be eliminated.

The materials used for the sensor 10 can be selected such that many of the materials within the capacitor portion 14 have coefficients of thermal expansion that are relatively the same. For example, each of the electrode assembly 12, the reference-side ring 144, the shell 146, the process-side ring 147, the process tube 148, the electrode 154, the diaphragm 156, and the plasma shield 158 may be made of the same material. If the pressure sensor 10 is used in a corrosive environment, that material can be iron-nickel alloys, by themselves, or include any one or more of copper, chromium, molybdenum, silicon, tungsten, or the like. Examples may include INCONEL™, INCOLOY™, MONEL™, HASTELLOY™, stainless steel, or the like. In one specific embodiment, INCONEL 718 can be used. Any or all of the electrode assembly 12, the reference-side ring 144, the shell 146, the process-side ring 147, the process tube 148, the electrode 154, the diaphragm 156, and the plasma shield 158 can be examples of electrically conductive portions. Note that different materials may be used for the various conductive portions.

In another embodiment (not shown), the housing 141 may include one or more insulating, resistive, or semiconductor materials. The materials of the housing should comprise a coefficient of thermal expansion that is similar to the coefficient of thermal expansion of the insulator 142. If any or all insulating, resistive, or semiconductor materials are used for the housing 141, a separate electrical connection may be made to control the signal or potential of the diaphragm 146 during operation. A wire or other interconnect (not shown) may be electrically connected to the diaphragm 146 and the process tube 148 or other external conductor. Welds, screws, rivets, conductive adhesives or epoxies may be used to make the electrical connections to the wire or other interconnect.

The insulator 142 should include a principal insulating material having a coefficient of thermal expansion similar to that of the other materials within the capacitor portion 14. This insulator should be stable to withstand stress and heat from the sensor manufacturing process. For sensors with reference side evacuated and sealed, the insulator should not outgas. In another embodiment, a glass-mica composite can be used for the insulating material. In one specific non-limiting example, glass-mica COMPOSITE 561™ made by Mykroy/Mycalex Ceramics, a division of Spaulding Composites Co., of Clifton, N.J. can be used. COMPOSITE 561™ is a molding grade of a glass-mica composite.

In another embodiment, the insulator 142 may comprise a glass-ceramic material. Examples of the glass-ceramic materials include glasses comprising at least one non-silicate oxide compound including alumina ($Al_2O_3$), barium oxide (BaO), cobalt monoxide (CoO), boron oxide ($B_2O_3$), lithium oxide ($Li_2O$), potassium oxide ($K_2O$), phosphorus pentoxide ($P_2O_5$), and the like. In a specific non-limiting embodiment, the glass comprises silicon dioxide ($SiO_2$) in a range of approximately 55–80 weight percent. U.S. Pat. Nos. 4,135,936, 4,414,282, and 5,820,989 include more details on the composition and formation of these glass-ceramic materials and are incorporated herein by reference.

Typically, the materials within the capacitor body 14, such as the electrode assembly 12, insulator 142, reference-side ring 144, process-side ring 147, shell 146, electrode 154, and diaphragm 156, should be selected such that the coefficient of thermal expansion of the insulator 142 (or its principal insulating material) is within approximately 50% of the coefficient(s) of thermal expansion of any or all of the other solid materials within the capacitor portion 14. Often, the coefficient of thermal expansion of the insulator 142 may be within approximately 10 percent of the coefficient(s) of thermal expansion for any or all of the other materials within the capacitor portion 14. Ideally, all the coefficients of thermal expansion should be substantially the same. By selecting materials with similar coefficients of thermal expansion, temperature-induced variations of readings from the sensor 10 should not occur or will be relatively insignificant.

Thermal coefficients of expansions for some exemplary materials are given. INCONEL™718 is approximately 13E–6 cm/cm/degree Celsius or 8E–6 in/in/degree Fahrenheit, MONEL™ is approximately 14E–6 cm/cm/degree Celsius or 7E–6 in/in/degree Fahrenheit, HASTELLOY™ is approximately 11–13E–6 cm/cm /degree Celsius or 6–7E–6 in/in /degree Fahrenheit, stainless steel 300 series (e.g., stainless steel 316 or the like) is approximately 18E–6 cm/cm/degree Celsius or 10E–6 in/in/degree Fahrenheit, stainless steel 400 series is approximately is approximately 11E–6 cm/cm/degree Celsius or 6E–6 in/in/degree Fahrenheit, alumina is approximately 7E–6 cm/cm/degree Celsius or 4E–6 in/in/degree Fahrenheit, fosterite is approximately 10E–6 cm/cm/degree Celsius or 6E–6 in/in/degree Fahrenheit, glass-mica COMPOSITE 561™ is approximately 13E–6 cm/cm/degree Celsius or 7E–6 in/in/degree Fahrenheit, each of glass-mica COMPOSITE 410 ™ and 555™ is approximately 11E–6 cm/cm/degree Celsius or 6E–6 in/in/degree Fahrenheit, and glass-ceramic materials are in a range of approximately 10E–6 to 18E–6 cm/cm/degree Celsius or 6E–6 to 10E–6 in/in/degree Farhenheit. After reading this specification, skilled artisans understand how to select materials to reduce the likelihood of significant adverse effects due to temperature changes.

During operation of the pressure sensor 10 as shown in FIG. 1, the pressure sensor 10 can have the diaphragm 156, the reference-side ring 144, the process-side ring 147, and the shell 146 at a first potential, such as approximately ground potential. A terminal (not shown) can be attached to the pinch-off connector 102, the electrode assembly 12, or both. The terminal can allow the electrode assembly 12, which is electrically connected to the electrode 154, to have a different potential compared to the diaphragm 156, and that potential may be positive or negative relative to the potential on the diaphragm 156. Additionally, a time varying signal or potential may be applied to the electrode assembly 12. The insulator 142 allows the electrode 154 to be electrically insulated from the diaphragm 156. Electrical connections between the electrode assembly 12 and the reference-side ring 144 or shell 146 should be avoided.

Figure 2:
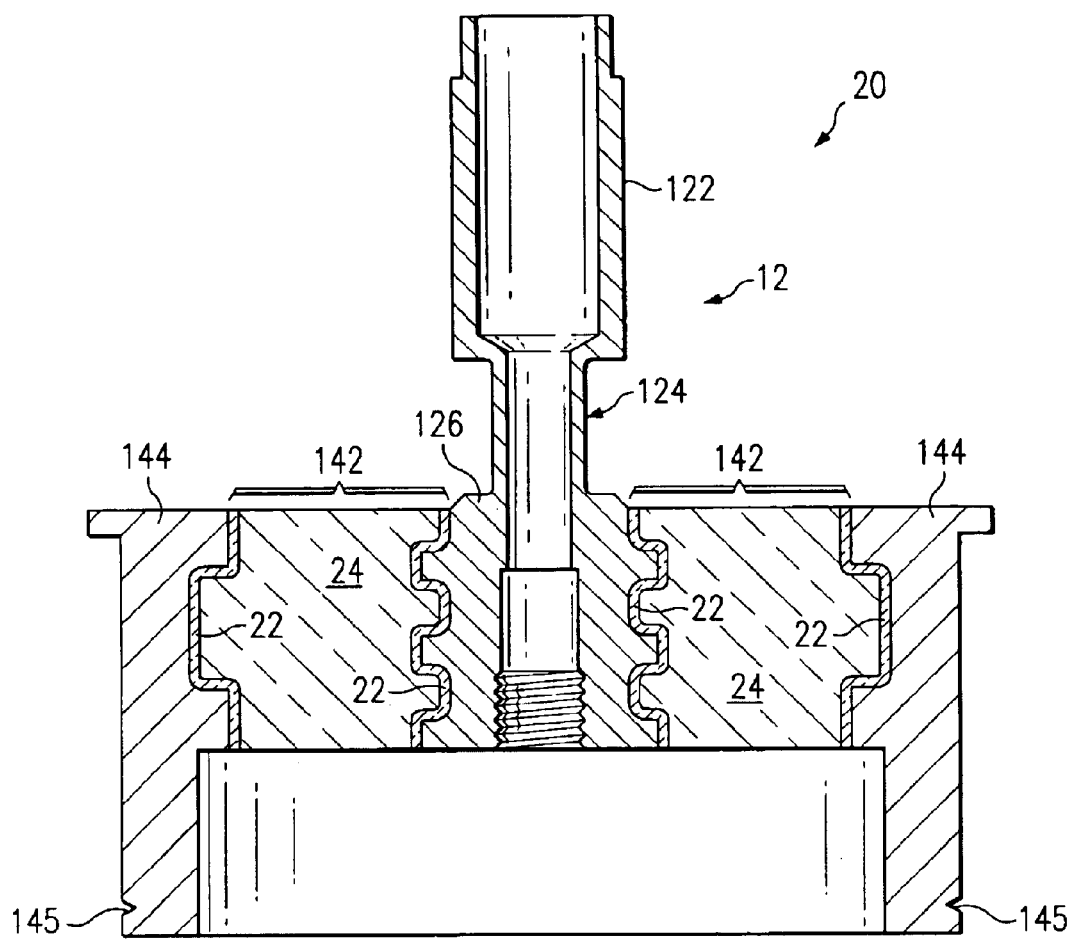
FIG. 2 includes an illustration of a component within the measuring device of FIG. 1.

FIG. 2 includes an illustration of a cross-sectional view of a component 20 within the pressure sensor 10. The component 20 can include the electrode assembly 12, the reference-side ring 144, and the insulator 142 that contacts the electrode assembly 12 (at the main body portion) and the reference-side ring 144. In forming the component 20, a jig, a vise, or other securing means may be used to hold the electrode assembly 12 and the reference-side ring 144 relatively stationary during a molding operation. Typically, at least portions of the electrode assembly 12 and the reference-side ring 144 lie within a mold. At least a part of the reference-side ring 144 laterally surrounds and is spaced apart from at least a part of the electrode assembly 12 to form a spaced-apart region.

Note that the inner surface of the reference-side ring 144 and the outer surface the electrode assembly 12 can have substantially varying topologies. These substantially varying topologies help to seal the reference side of the component from the exterior side of the component that may be exposed to atmospheric pressure. The substantially varying topologies can form a longer and more difficult path for air, water, or other external contaminant to migrate to reach the evacuated region on the reference side of the diaphragm 156. This also strengthens the bonds between the parts. A serpentine, saw-tooth, square-wave, or nearly any other pattern can be used. This substantially varying topology can be achieved by using a router or other cutting tool to obtain the shape desired. Note that the substantially varying topology can have changes in topology that are typically greater than the root mean square surface roughnesses of the materials used for the reference-side ring 144 and the electrode assembly 12 when polished.

An optional glass seal 22 may be formed along the surfaces of the reference-side ring 144 and the electrode assembly 12 as shown in FIG. 2. In one example, a glass paste can be used to improve the metal-ceramic seal between the ring 144 and an insulating material. As an example, GEC-100 ™, made by Aremco Products, Inc. of Valley Cottage, N.Y., is a glass paste that can be used. The glass paste may be cured before or after forming an insulating material within the gap between the electrode assembly 12 and the reference-side ring 144. Next, a moldable insulating material 24, (e.g., glass-mica COMPOSITE 561™ or the like), can be molded to lie between the reference-side ring 144 and the electrode assembly 12. The insulating material 24 may have a coefficient of thermal expansion similar to that of the reference-side ring 144 and the electrode assembly 12. Following the molding operation, an optional anneal may be performed to improve the integrity of the seals between the various materials present within the component 20. In an alternative embodiment, the combination of the glass seal 22 and moldable insulating material 24 used for the insulator 142 may be replaced by a glass-ceramic material previously described.

In some applications, when the gettering material 106 is used and temperature activated, the activation temperature can be as high as approximately 800 degrees Celsius. The selection of the materials for the component 20 is such that it can withstand short-term thermal shock. It is also common that the sensor 10 may operate at an elevated temperature (sometimes above approximately 200 degrees Celsius). The selection of materials for the component 20 is also such that they do not significantly contribute to contamination or outgassing that may occur when evacuating the reference side of the diaphragm or during subsequent processing conditions if the pressure sensor 10 is exposed to an elevated temperature.

Referring to FIG. 1, the reference side of the diaphragm 156 is typically taken to a very low pressure. In many instances, this pressure may be no greater than approximately 10 micro-Pascals (microPa) or $10^{-7}$ Torr, and typically may be less than 1 microPa or $10^{-8}$ Torr. After the reference side is evacuated, the pinch-off connector 102 can be cold welded and sealed using a pliers-like tool. Under sufficient pressure of the tool, the metal of the pinch-off connector 102 will fuse together and shut. Other methods of sealing the device may be used.

Figure 3:
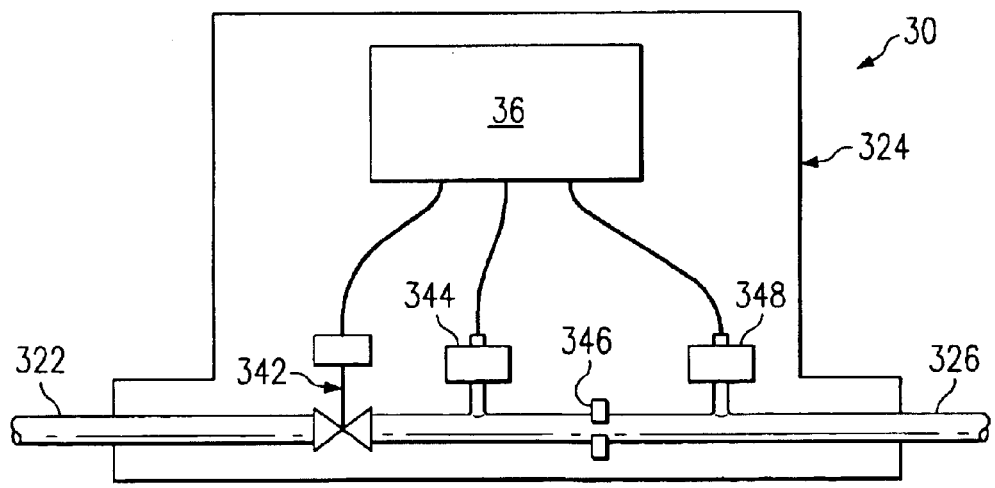
FIG. 3 includes a diagram of a flow measuring and control apparatus using the measuring device of FIG. 1.

FIG. 3 includes a diagram of a flow measuring and control apparatus 30, such as a mass flow controller. A fluid can flow through the inlet tube 322, the main body 324, and the outlet tube 326. Although not shown, electronics can be supplied to the apparatus 30 and may be electrically coupled to a controller 36 within the main body 324. The fluid can be designed to flow through a valve 342 and a restriction 346.

The restriction 346 can include an orifice, a venturi, or the like. Two pressure sensors 344 and 348, similar to sensor 10 in FIG. 1, may lie on opposite sides of the restriction 346. The flow rate of the fluid can be determined by the pressure differential across the restriction 346. Electronic signals are transmitted to the controller 36. By knowing the tube diameter(s), type of restriction 346 (orifice, venturi, etc.) and diameter of the restriction 346, and the readings from sensors 344 and 348, the controller 36 or remote computer can determine a flow rate through the apparatus 30. The flow rate can be controlled by adjusting the valve 342. After reading all of this specification, skilled artisans appreciate that other flow measuring or control apparatuses may be used and be configured differently.

Figure 4:
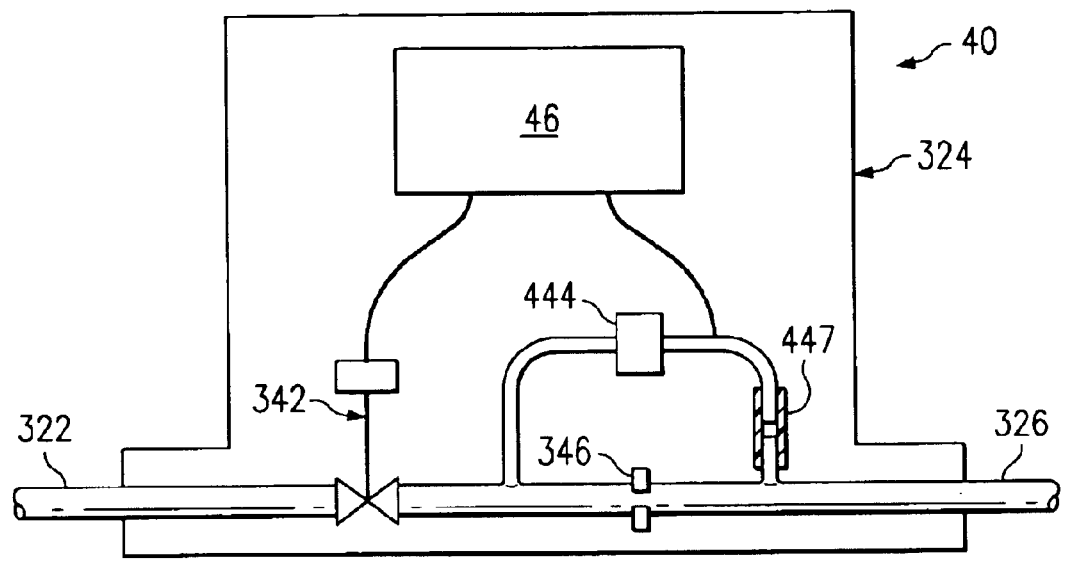
FIG. 4 includes an illustration of a perspective view of a portion of the variable capacitance measuring device and a heat sink and an electrical connection made to the device.

FIG. 4 includes a diagram of a flow measuring and control apparatus 40, such as a mass flow controller, where a single differential pressure sensor 444 (similar to the differential pressure sensor previously described) may be used instead of the combination of pressure sensors 344 and 348 in FIG. 3. Apparatus 40 may be used with dry gasses including clean dry air, nitrogen, argon, oxygen, hydrogen, or the like. The sensor 444 can have its end connected at points along opposite sides of the restriction 346. In this particular embodiment, the electrode side of the diaphragm is connected to the downstream (lower pressure) side of the restriction 346 to reduce the likelihood of condensation forming within the gap 150. An electrical insulating section 447 of tubing may be used to substantially prevent the electrode 154 from being electrically shorted to the housing. Most plastic and polymeric tubing may be used. Alternatively, glass or another ceramic material may be used. The flow rate of the fluid can be determined by the pressure differential across the restriction 346. Electronic signals are transmitted to the controller 46. By knowing the tube diameter(s) before and after the restriction, type of restriction 346 (orifice, venturi, etc.) and diameter of the restriction 346, and the reading from sensor 444, the controller 46 or remote computer can determine a flow rate through the apparatus 40. The flow rate can be controlled by adjusting the valve 342. After reading all of this specification, skilled artisans appreciate that other flow measuring or control apparatuses may be used and be configured differently.

FIG. 5 includes an illustration of a perspective view of the pressure sensor 10 including a heat sink 54 and an electronic terminal 52. In this embodiment, heat may be applied to the capacitor portion 14 of the sensor 10 to reduce the likelihood of condensation forming on process side of the diaphragm 156. Some exemplary temperatures for the capacitor portion 14 may be in a range of approximately 40–200 degrees Celsius. The heat sink 54 may laterally surround the tube 124 (not shown in FIG. 5) to help dissipate heat so that less heat is transferred to the housing 122 and pinch-off connector 102. This allows the electronics connected to the pinch-off connector 102 to stay at a cooler temperature. If the heat sink 54 includes a conductive material, the heat sink 54 should be positioned so that it does not electrically short the electrode assembly 12 to the reference-side ring 144 or the shell 146 of the capacitor portion 14. If the heat sink 54 includes a thermally conductive but not electrically conductive material, such as aluminum nitride, FR4, or the like, such concerns with an electrical short are substantially reduced. The same heat sink 54 or the like, can absorb the getter activation heat and reduce the heat transferred to the capacitor portion 14, thus substantially eliminating thermal shock.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

What is claimed is:

1. A variable capacitance measuring device comprising:
   an electrode assembly having a first coefficient of thermal expansion; and
   an insulating material having a second coefficient of thermal expansion, wherein:
      the insulating material laterally surrounds the electrode assembly; and
      the second coefficient of thermal expansion is within approximately 50% of the first coefficient of thermal expansion.

2. The variable capacitance measuring device of claim 1, further comprising a capacitor housing bonded to the insulating material, wherein the capacitor housing:
   laterally surrounds the insulating material; and
   includes a conductive portion that is electrically connected to a diaphragm.

3. The variable capacitance measuring device of claim 2, wherein:
   the conductive portion has a third coefficient of thermal expansion; and
   the second coefficient of thermal expansion is within approximately 50% of the first and third coefficients of thermal expansion.

4. The variable capacitance measuring device of claim 1, further comprising:
   an electrode coupled to the electrode assembly;
   a conductive portion bonded to the insulating material; and
   a diaphragm coupled to the conductive portion,
   wherein:
      a combination of the electrode, the diaphragm, and a gap between the electrode and the diaphragm is a variable capacitor; and
      a distance between the electrode and the diaphragm is in a range of approximately 50–250 microns.

5. The variable capacitance measuring device of claim 4, further comprising a pinch-off connector, wherein:
   the electrode assembly comprises a getter housing; and
   the electrode, the getter housing, and the pinch-off connector lie along a common axis.

6. The variable capacitance measuring device of claim 5, wherein the electrode assembly further comprises a tube that lies between the getter housing and a capacitor portion of the variable capacitance measuring device, wherein:

the getter housing has a getter housing width and is spaced apart from the capacitor portion by the tube; and the tube has a tube width that is less than the getter housing width.

7. The variable capacitance measuring device of claim 1, wherein the electrode assembly, comprises an alloy comprising iron and nickel, and the insulating material is selected from a glass-mica composite and a glass-ceramic material.

8. A variable capacitance measuring device of claim 1, wherein the insulating material is bonded to a lateral surface of the electrode assembly.

9. The variable capacitance measuring device of claim 8, wherein the electrode assembly passes through the insulating material.

10. The variable capacitance measuring device of claim 1, wherein the insulating material contacts a lateral surface of the electrode assembly.

11. The variable capacitance measuring device of claim 10, wherein the electrode assembly passes through the insulating material.

12. A component for a variable capacitance measuring device, wherein the component comprises:

an electrode assembly having a first coefficient of thermal expansion; and an insulating material having a second coefficient of thermal expansion, wherein:

the insulating material laterally surrounds the electrode assembly; and the second coefficient of thermal expansion is within approximately 50% of the first coefficient of thermal expansion.

13. The component of claim 12, wherein the insulating material comprises a glass-ceramic material.

14. The component of claim 13, further comprising a capacitor housing laterally surrounding the insulating material, wherein the glass-ceramic material contacts the electrode assembly and the capacitor housing.

15. The component of claim 12, wherein the insulating material comprises a glass-mica material.

16. The component of claim 15, wherein the insulating material further comprises a glass seal that lies between the electrode assembly and the glass-mica composite.

17. A variable capacitance measuring device comprising:

an electrode assembly; and an insulating material, wherein:

the insulating material laterally surrounds the electrode assembly; and the insulating material has a coefficient of thermal expansion that is substantially similar to coefficients of thermal expansion of each material in a capacitor portion of the variable capacitance measuring device.

18. The variable capacitance measuring device of claim 17, wherein the electrode assembly has a surface with a substantially varying topology.

19. The variable capacitance measuring device of claim 18 wherein the surface is a lateral surface.

20. The variable capacitance measuring device of claim 17, further comprising a conductive portion with a substantially varying topology.

21. The variable capacitance measuring device of claim 20, wherein the substantially varying topology is on a lateral surface.

22. The variable capacitance measuring device of claim 17, wherein the electrode assembly further comprises an electrode and a getter housing.

23. The variable capacitance measuring device of claim 22, further comprising a pinch-off connector, wherein the electrode, getter housing and pinch-off connector are axially aligned.

* * * * *